United States Patent
Viero

(10) Patent No.: US 9,282,573 B2
(45) Date of Patent: Mar. 8, 2016

(54) RANDOM ACCESS CONTROL METHOD AND SYSTEM

(75) Inventor: Timo Viero, Espoo (FI)

(73) Assignee: QUALCOMM Incorporated, San Diego, CA (US)

(*) Notice: Subject to any disclaimer, the term of this patent is extended or adjusted under 35 U.S.C. 154(b) by 873 days.

(21) Appl. No.: 10/014,153

(22) Filed: Nov. 6, 2001

(65) Prior Publication Data

US 2002/0089957 A1  Jul. 11, 2002

Related U.S. Application Data

(63) Continuation of application No. PCT/EP99/03630, filed on May 26, 1999.

(51) Int. Cl.
*H04J 3/00* (2006.01)
*H04W 74/00* (2009.01)

(52) U.S. Cl.
CPC .................. *H04W 74/006* (2013.01)

(58) Field of Classification Search
USPC ......... 370/319, 320, 324, 328, 335, 337, 336, 370/342, 344, 347, 447, 432, 441, 457, 370/348–350, 395.4, 450, 458–459, 370/461–462, 509, 512, 514, 437, 438, 442, 370/470, 230, 390, 394, 407, 474; 375/140, 375/141, 144–148, 135, 136, 219, 220, 134, 375/137, 145, 149, 130, E1.003, E1.012, 375/152, 343; 455/518, 519, 524, 435.3, 455/452.2, 450, 452.1

See application file for complete search history.

(56) References Cited

U.S. PATENT DOCUMENTS

| | | | | |
|---|---|---|---|---|
| 5,012,469 A * | 4/1991 | Sardana | ........................ | 370/348 |
| 5,172,375 A * | 12/1992 | Kou | .............................. | 370/322 |
| 5,526,357 A * | 6/1996 | Jandrell | ........................ | 370/346 |
| 5,541,924 A * | 7/1996 | Tran et al. | ..................... | 370/347 |
| 5,673,259 A * | 9/1997 | Quick, Jr. | ...................... | 370/342 |
| 5,680,398 A | 10/1997 | Robinson | | |
| 5,694,391 A * | 12/1997 | Diachina et al. | .............. | 370/346 |

(Continued)

FOREIGN PATENT DOCUMENTS

| | | |
|---|---|---|
| EP | 0889664 | 1/1999 |
| EP | 0889664 A2 | 1/1999 |

(Continued)

OTHER PUBLICATIONS

3GPP, TS 25.211, V2.0.0 (Apr. 1999).

(Continued)

*Primary Examiner* — Phuongchau Ba Nguyen
(74) *Attorney, Agent, or Firm* — Larry J. Moskowitz

(57) ABSTRACT

The present invention relates to a method and system for performing a random access operation between a mobile station and a network element such as a base transceiver station (10), wherein allowed access slots for random access channels are defined by the network and are signaled to the mobile station (20). The definition of the allowed access slots is performed on the basis of a parameter set by the base transceiver station (10) and transmitted to the mobile station (20) which determines the allowed access slots based on the parameter. Thus, the number of allowed access slots can be defined by the network and can be changed dynamically based on the random access messaging load and the hardware requirements.

48 Claims, 4 Drawing Sheets

(56) References Cited

U.S. PATENT DOCUMENTS

| | | | |
|---|---|---|---|
| 5,752,193 A * | 5/1998 | Scholefield et al. | 370/329 |
| 5,822,359 A * | 10/1998 | Bruckert et al. | 375/145 |
| 5,883,887 A * | 3/1999 | Take et al. | 370/329 |
| 6,073,018 A * | 6/2000 | Sallberg | 455/435.2 |
| 6,075,779 A | 6/2000 | Agarwal et al. | |
| 6,169,759 B1 * | 1/2001 | Kanterakis et al. | 370/342 |
| 6,285,662 B1 * | 9/2001 | Watanabe et al. | 375/347 |
| 6,314,081 B1 * | 11/2001 | Chennakeshu et al. | 370/203 |
| 6,330,459 B1 * | 12/2001 | Crichton et al. | 455/562.1 |
| 6,373,833 B1 * | 4/2002 | Suonvieri et al. | 370/347 |
| 6,393,047 B1 * | 5/2002 | Popovic' | 375/140 |
| 6,430,163 B1 * | 8/2002 | Mustajarvi | 370/310 |
| 6,438,375 B1 * | 8/2002 | Muller | 455/435.3 |
| 6,567,482 B1 * | 5/2003 | Popovic' | 375/343 |
| 6,574,212 B1 * | 6/2003 | Halton et al. | 370/348 |
| 6,643,275 B1 * | 11/2003 | Gustafsson et al. | 370/328 |
| 6,674,765 B1 * | 1/2004 | Chuah et al. | 370/458 |
| 6,697,346 B1 * | 2/2004 | Halton et al. | 370/335 |
| 6,724,813 B1 * | 4/2004 | Jamal et al. | 375/219 |
| 6,836,469 B1 * | 12/2004 | Wu | 370/322 |
| 6,859,445 B1 * | 2/2005 | Moon et al. | 370/335 |
| 2002/0089957 A1 * | 7/2002 | Viero | 370/336 |
| 2003/0095528 A1 * | 5/2003 | Halton et al. | 370/342 |
| 2004/0008658 A1 * | 1/2004 | Dahlman et al. | 370/342 |
| 2004/0136321 A1 * | 7/2004 | Ren et al. | 370/230 |
| 2005/0152265 A1 * | 7/2005 | Denk | 370/209 |
| 2005/0254467 A1 * | 11/2005 | Li et al. | 370/335 |
| 2006/0018289 A1 * | 1/2006 | Schulist et al. | 370/335 |

FOREIGN PATENT DOCUMENTS

| | | |
|---|---|---|
| GB | 2329556 | 3/1999 |
| JP | 11-55179 | 2/1999 |
| JP | 11055179 | 2/1999 |

OTHER PUBLICATIONS

International Search Report—PCT/EP99/003630, International Search Authority—European Patent Office, Feb. 7, 2000.

* cited by examiner $T_{AICH}=0$

| Fmod3 | A=0 (000) | A=1 (001) | A=2 (010) | A=4 (100) |
|---|---|---|---|---|
| 0 | - | 0, 3, 6 | 1, 4, 7 | 2, 5 |
| 1 | - | 1, 4, 7 | 2, 5 | 0, 3, 6 |
| 2 | - | 2, 5 | 0, 3, 6 | 1, 4, 7 |

Fig. 3

$T_{AICH}=1$

| A=0 (0000) | A=1 (0001) | A=2 (0010) | A=4 (0100) | A=8 (1000) |
|---|---|---|---|---|
| - | 0, 4 | 1, 5 | 2, 6 | 3, 7 |

Fig. 4

$T_{AICH}=0$

| A=0 (000) | A=1 (001) | A=2 (010) | A=4 (100) |
|---|---|---|---|
| - | 0, 3, 6, 9, 12 | 1, 4, 7, 10, 13 | 2, 5, 8, 11, 14 |

Fig. 5

$T_{AICH}=1$

| Γmod4 | A=0 (0000) | A=1 (0001) | A=2 (0010) | A=4 (0100) | A=8 (1000) |
|---|---|---|---|---|---|
| 0 | - | 0, 4, 8, 12 | 1, 5, 9, 13 | 2, 6, 10, 14 | 3, 7, 11 |
| 1 | - | 1, 5, 9, 13 | 2, 6, 10, 14 | 3, 7, 11 | 0, 4, 8, 12 |
| 2 | - | 2, 6, 10, 14 | 3, 7, 11 | 0, 4, 8, 12 | 1, 5, 9, 13 |
| 3 | - | 3, 7, 11 | 0, 4, 8, 12 | 1, 5, 9, 13 | 2, 6, 10, 14 |

Fig. 6

RANDOM ACCESS CONTROL METHOD AND SYSTEM

This application is a continuation of international application serial number PCT/EP99/03630, filed 26 May. 1999.

FIELD OF THE INVENTION

The present invention relates to a method and system for performing random access in a mobile communication network comprising a base transceiver station and a mobile station, such as a radio access network of a WCDMA (Wideband Code Division Multiple Access) system like the UMTS (Universal Mobile Telecommunications System).

BACKGROUND OF THE INVENTION

WCDMA has been chosen as the radio technology for the paired bands of the UMTS. Consequently, WCDMA is a common radio technology standard for third-generation wide-area mobile communications.

A fast and efficient random access procedure has been defined in the WCDMA system, wherein random access is based on a slotted Aloha transmission of a random access burst. The burst contains a preamble part, where a cell specific preamble code is used to transmit a preamble sequence randomly picked by the mobile station. The preamble sequence is detected in the receiver using a matched filter, and specifies a subset of a code tree that defines the channelization code (short code) used for an RACH (Random Access CHannel) message part.

In particular, a random access communication between a mobile station and the base transceiver station is established by means of an uplink PRACH (Physical Random Access Channel) and a downlink AICH (Acquisition Indication Channel), wherein the PRACH carries a RACH (Random Access Channel) through which the mobile station communicates with the base transceiver station. The mobile station transmits a random access message to the base transceiver station via the RACH when it wants to initiate a dedicated channel for e.g. a speech connection or it has some packet data which are to be transmitted. The base transceiver station transmits acknowledgments of RACH preamble signatures to the mobile station on the AICH, according to which the RACH message transmission is started.

However, in the common proposals for the WCDMA system, only a subset of all possible PRACH and AICH access slots is used, which limits the capacity of the RACH. This is not desirable especially in cases of high network loads.

Moreover, the number of access slots of the PRACH and the AICH is low. A preamble and an acquisition indicator (AI) may be transmitted every third or fourth access slot, so that the amount of hardware resources to be allocated to the RACH reception is low. If a single PRACH with such a limited capacity is not sufficient for a random access procedure, several PRACH and AICH channels per cell of the base transceiver station have to be configured. This leads to an undesirable complex random access procedure.

SUMMARY OF THE INVENTION

It is therefore an object of the present invention to provide a random access method and system, which enable a more flexible use of the random access channels.

This object is achieved by a method for performing random access in a mobile communication network having a base transceiver station and a plurality of mobile stations, comprising the steps of:

transmitting a parameter defining allowed uplink access slots from the base transceiver station to a mobile station;
determining said allowed uplink access slots at the mobile station based on the parameter; and
using at least one of the determined allowed uplink access slots for performing a random access operation to the base transceiver station.

Furthermore, the above object is achieved by a system for performing random access in a mobile communication network, comprising:

a network element arranged for transmitting a parameter defining allowed uplink access slots; and
a plurality of mobile stations arranged for receiving the transmitted parameter, for determining the allowed uplink access slots based on the received parameter, and for using at least one of the determined allowed uplink access slots for performing a random access to the base transceiver station.

Additionally, the above object is achieved by a network element for a mobile communication network comprising a plurality of mobile stations, comprising:

setting means for setting a parameter defining allowed uplink access slots for performing a random access operation; and
transmitting means for transmitting the parameter to the plurality of mobile stations.

In addition thereto, the above object is achieved by a mobile station for a mobile communication network having at least one network element allowing a random access operation, comprising:

receiving means for receiving from the network element a parameter defining allowed uplink access slots for the random access operation;
determining means for determining the allowed uplink access slots based on the received parameter; and
transmitting means for transmitting a random access message to the network element using at least one of the determined allowed uplink access slots.

Accordingly, the allowed access slots of the random access channels can be defined and signaled to the mobile stations. The same algorithms can be used by the mobile station and the base transceiver station to determine the access slots in which the transmission or reception can be performed, based on required parameters. Thus, the number of allowed access slots can be defined by the network and may be changed even dynamically based on the random access messaging load or hardware parameters.

According to the invention, the number of allowed access slots of the random access channels can be configured to match more closely the requirements of the random access communication. Since the network defines the allowed access slots, hardware resources of the base transceiver station can be taken into account when deciding on the-number of allowed access slots. The selection of the uplink access slots for each preamble transmission can be randomized, to thereby reduce preamble collisions. Since the number of allowed access slots for the random access channels is a network-specific variable, the amount of base transceiver station resources which must be allocated to random access reception and transmission may change dynamically.

Preferably, the parameter is transmitted via a broadcast channel, such as the BCH channel of the WCDMA system. The random access may be performed via the PRACH uplink channel and the AICH downlink channel.

The parameter may define a subset of available access slots of the mobile communication network. The subset may be determined by another parameter transmitted from the base transceiver station to the mobile station, wherein the other parameter can be a timing parameter defining a transmission timing of an uplink access slot. The other parameter may also be transmitted via the broadcast channel. Preferably, the bit number of the parameter may be changed in dependence on the other parameter.

A transmission of a preamble signature or an acquisition indication may be disabled in dependence of the value of the parameter.

Furthermore, an index of an allowed uplink access slot may be calculated on the basis of the value of the parameter and a frame number of a frame used for transmitting an uplink access slot. In this case, the parameter may determine an offset to be added to the calculated index.

The allowed downlink slots may be determined by adding a predetermined value to an index of a received uplink slot. In this case, the predetermined value may depend on a timing parameter defining a transmission timing of the uplink slot.

Alternatively, an index of an allowed uplink access slot may be determined on the basis of the value of the parameter irrespective of a frame number of a frame used for transmitting an uplink access slot.

Additionally, the binary configuration of the parameter may determine a combination of calculated indices obtained for other values of the parameter, wherein the other values corresponds to the binary weights of the binary configuration.

The base transceiver station may comprise a transmitting means arranged for transmitting the parameter via the broadcast channel.

Furthermore, the setting means may be arranged to set the parameter in dependence on the timing parameter value defining a transmission timing of an uplink access slot in the random access operation.

Additionally, the determining means of the mobile station may be arranged to determine the allowed uplink access slots on the basis of the received parameter and the timing parameter. In particular, determining means may be arranged to calculate an index of an allowed uplink access slot on the basis of the value of the received parameter and a frame number of a frame used for transmitting an uplink access slot. Alternatively, the determining means may be arranged to determine an index of an allowed uplink access slot on the basis of the value of the parameter irrespective of a frame number of a frame used for transmitting an uplink access slot.

Preferably, a selection means is provided in the mobile station for randomly selecting from allowed access slots determined by the determining means an uplink access slot to be used for transmitting a preamble of said random access message. In this case, the consecutive preambles may be transmitted a predetermined number of access slots apart. The predetermined number may depend on a timing parameter received by said receiving means. Alternatively, the selection means may be arranged to perform the random selection any time a preamble needs to be transmitted.

BRIEF DESCRIPTION OF THE DRAWINGS

In the following, the present invention will be described in greater detail on the basis of a preferred embodiment with reference to the accompanying drawings, in which:

FIG. 3 shows a table indicating a relationship between allowed access slots, a radio frame index and received parameters, according to a first example of the preferred embodiment of the present invention;

FIG. 4 shows a table indicating a relationship between allowed access slots and received parameters according to the first example of the preferred embodiment of the present invention;

FIG. 5 shows a table indicating a relationship between allowed access slots and received parameters according to a second example of the preferred embodiment of the present invention; and FIG. 6 shows a table indicating a relationship between allowed access slots, a radio frame index and received parameters, according to the second example of the preferred embodiment of the present invention.

DESCRIPTION OF THE PREFERRED EMBODIMENTS

In the following, the preferred embodiment of the method and system according to the present invention will be described on the basis of a WCDMA system.

Before a mobile station (MS) can start transmitting on the PRACH channel, it needs to acquire several parameters by decoding a message broadcast from a base transceiver station (BTS) via the Broadcast Channel (BCH). In particular, the MS needs to know e.g. the available access slots of the PRACH and AICH channels and the AICH transmission timing parameter $T_{AICH}$. These parameters must also be known at a layer 1 transceiver of the BTS, so that a PRACH reception and a AICH transmission can be performed.

According to the preferred embodiment of the present invention, the MS or a BTS can derive the available access slots on the basis of a parameter A transmitted via the BCH. Thus, the allowed access slots are defined on the basis of the parameters A and $T_{AICH}$. However, the present invention is not restricted thereto, i.e. the allowed access slots may as well be defined solely on the basis of the parameter A alone.

After the allowed access slots have been determined at the MS, the MS selects an access slot in which a preamble signature will be transmitted.

First Example

Figure 1:
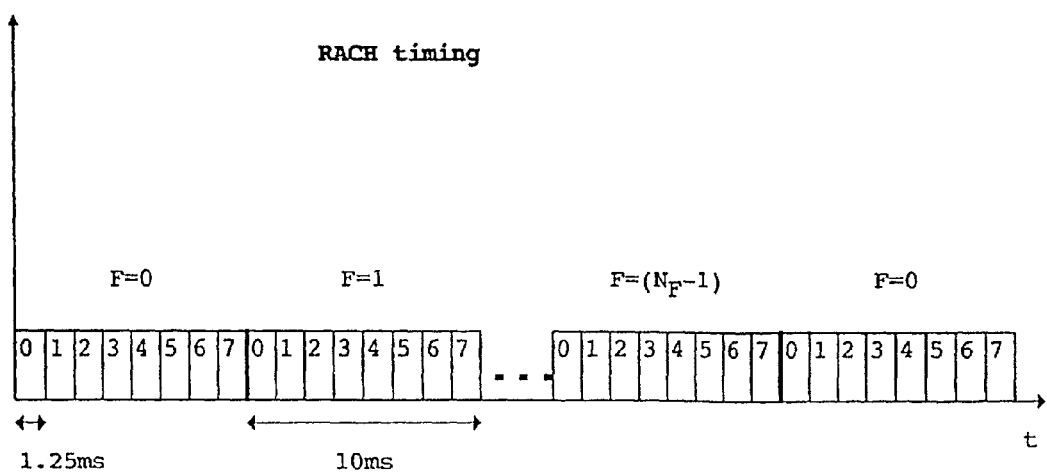
FIG. 1 shows a random access timing used in a random access channel according to a first example of the preferred embodiment of the present invention.

FIG. 1 shows a first example of a possible timing configuration of the random access channels. In this case, a radio frame of the random access channels has a length of 10 ms, wherein both uplink and downlink access slots have a length of 1.25 ms, such that each radio frame comprises eight access slots which can be allowed for the random access operation. For each uplink access slot, a corresponding downlink access slot is provided. Preambles and AIs are transmitted in time alignment with the uplink and downlink access slots, respectively. An uplink access slot is transmitted a specified time period before the corresponding downlink access slot. This tire period is equal to 1.75 ms or 3 ms for $T_{AICH}=0$ and $T_{AICH}=1$, respectively.

However, the present invention is not restricted to the above timing. Any other timing scheme, such as 15 access slots per 20 ms according to the second example described later, could be implemented as well.

The RACH message can be transmitted either three or four access slots after the latest transmitted preamble, depending on the value of $T_{AICH}$. The timing offset between uplink and downlink access slots, as seen from the MS, is equal to 0.5 ms.

Therefore, an access slot starts 0.5 ms earlier in the uplink direction as compared to the downlink direction.

According to FIG. 1, the access slots in each frame F are denoted by indices 0 to 7, and the radio frames F are numbered from 0 to ($N_F$−1), wherein $N_F$ denotes the number of available radio frames indices. In the above alternative case of e.g. 15 access slots per 20 ms (not shown), the access slots are denoted by indices 0 to 14.

In general, $N_F$ must be an integer number large enough to enable a selection combining in a switching means such as a radio network controller (RNC). This can be achieved, if $N_F$ satisfies the following conditions:

($N_F$−1) modulo 3=2, and ($N_F$/2 −1) modulo 4=3

Figure 2:
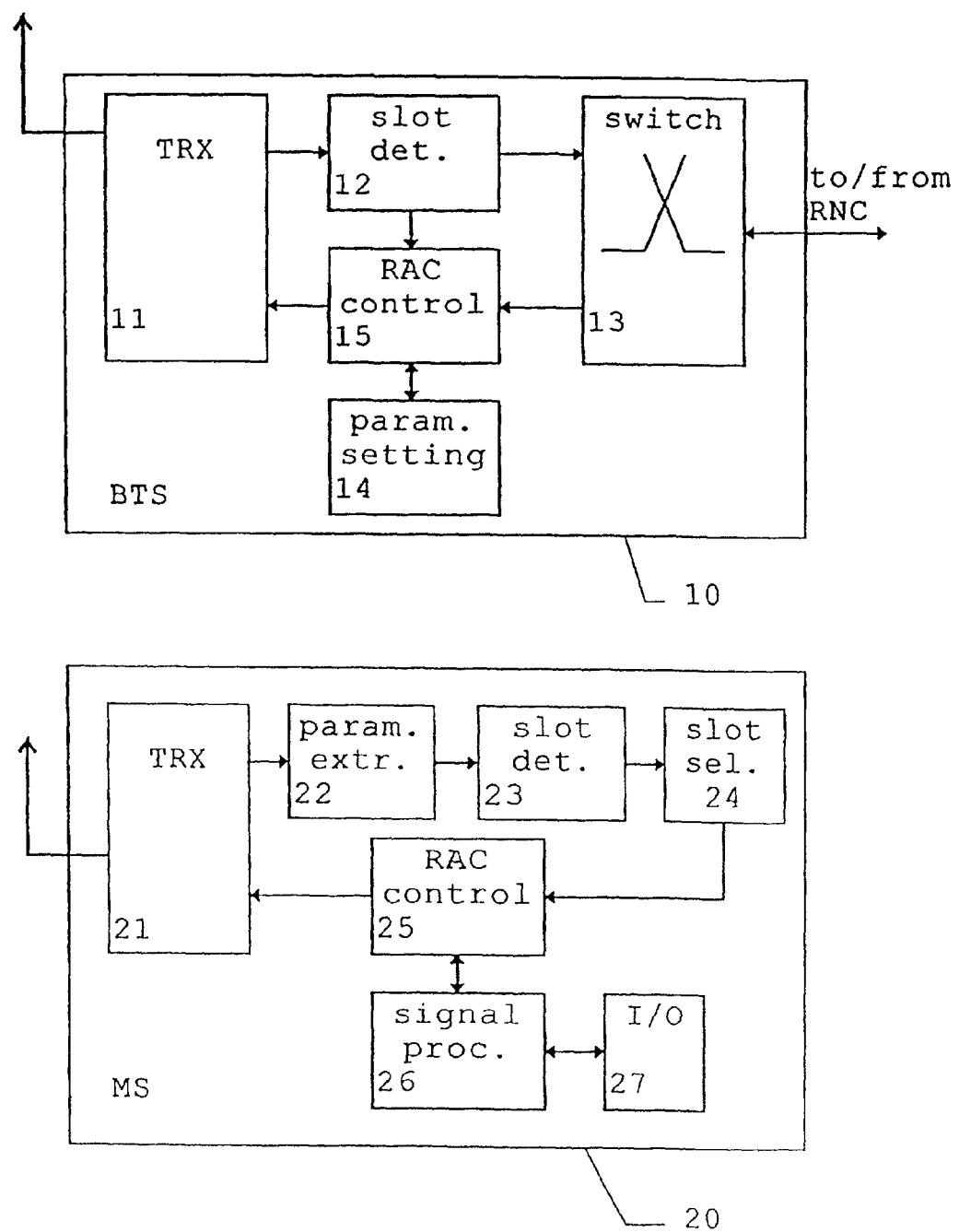
FIG. 2 shows a principle block diagram of a base transceiver station and a mobile station according to the preferred embodiment of the present invention.

FIG. 2 shows a principle block diagram of a BTS 10 and an MS 20 according to the preferred embodiment of the present invention.

The BTS 10 comprises a transceiver (TRX) 11 for receiving and transmitting messages via corresponding radio channels to the MS 20. Furthermore, the BTS 10 comprises a parameter setting unit 14 in which random access parameters such as the parameter A and the timing parameter $T_{AICH}$ are set. The setting may be controlled by the BTS 10 or on the basis of an external command received from the mobile network.

The parameter setting unit 14 is connected to a random access (RAC) control unit 15 for performing a signal processing required for the random access operations via the BCH and AICH channels. Based on the parameters received from the parameter setting unit 14 the RAC control unit 15 supplies a corresponding broadcast message to the TRX 11 which transmits the broadcast message to MSs located in the corresponding radio cell controlled by the BTS 10.

Furthermore, the RAC control unit 15 is connected to a switch 13 by means of which a connection to another network element such as a radio network controller (RNC) can be established in order to receive e.g. a control command for externally controlling the parameter setting unit 14.

In case the BTS 10 receives a random access message from the MS 20 via the PRACH channel, the TRX 11 supplies the received message to a slot determination unit 12 arranged to detect an index of the uplink access slot selected by the MS 20 from the allowed access slots defined by the parameters A and $T_{AICH}$. Based on the detected index of the received uplink access slot, the slot determination unit 12 determines indices of allowed downlink slots of the AICH channel, to be used for transmitting a response message to the MS 20. The determination of the indices of the allowed downlink access slots is performed on the basis of an algorithm described later.

Additionally, the slot determination unit 12 is connected to the switch 13 in order to supply received random access messages to the network.

The MS 20 comprises a TRX 21 for transmitting and receiving messages via corresponding radio channels. The TRX 21 is connected to a parameter extraction unit 22, where the random access parameters such as the parameter A and the parameter $T_{AICH}$ are extracted from the BCH channel. The extracted parameters are supplied to a slot determination unit 23 arranged to determine the allowed uplink access slots based on a predefined algorithm which may depend on the value of the parameter $T_{AICH}$ and which is described later. The determined allowed access slots are supplied to a slot selection unit 24 in which at least one desired uplink access slot is selected. The uplink access slot may be selected randomly based on the determined allowed access slots. Once the selection is done, consecutive preambles are transmitted either three or four access slots apart, depending on the value of the parameter $T_{AICH}$.

Alternatively, the MS 20 may randomly select a number which defines a subset of the determined allowed access slots, which the MS 20 will then use for transmitting the random access message.

The index of the selected access slot is supplied to a random access (RAC) control unit 25 arranged for performing a signal processing required for the random access operations via the PRACH channel. The RAC control unit 25 generates a random access message based on an information supplied from an I/O unit 27 via a signal processing unit 26 to the TRX 21, in order to be transmitted via the PRACH channel to the BTS 10. The signal processing unit 26 is provided for performing the required base band signaling of any input or output signal exchanged between the RAC control unit 25 and the I/O unit 27.

In the following, algorithms used by the slot determining unit 23 and the RAC control unit 15 for determining allowed uplink and, respectively, downlink access slots based on the parameters A and $T_{AICH}$ are described with reference to FIGS. 3 and 4.

As already mentioned, each radio frame F may contain eight access slots each having a respective index a, wherein 0≤a≤7. The index of the radio frame F ranges between 0 and ($N_F$−1). Alternatively, two consecutive radio frames 2·F and 2·F+1 which form a 20 ms frame Γ may contain fifteen access slots, i.e. 0≤a≤14.

Initially, the network, e.g. the BTS 10, informs the mobile stations, located within the covered radio area, of the available access slots of the PRACH and AICH channel by transmitting the parameters $T_{AICH}$ and A in the BCH channel, wherein $T_{AICH}$ may be equal to 0 or 1. In case $T_{AICH}$=0, the value of A may range between 0 and 7 (i.e. 0≤A≤7, or 000≤A≤111 in binary expression). In case the value of $T_{AICH}$ equals to 1, the values of the parameter A may range between 0 and 15 (i.e. 0≤A≤15, or 0000≤A≤1111 in binary expression).

According to the preferred embodiment, each bit of the binary expression of the parameter A indicates either an inclusion or an exclusion of a subset of access slots to the set of allowed access slots.

FIG. 3 shows a table indicating allowed subsets of access slots in dependence on the parameter A and the frame index F, in case the value of the parameter $T_{AICH}$ equals to 0.

In case A is equal to 0 (000 in binary expression), the transmission of a preamble signature or an AI is forbidden or disabled in all access slots, since each bit of the binary expression is 0.

When A equals to 1 (001 in binary expression), the indices of the allowed uplink access slots in any radio frame F are obtained by the equation:

i=3·N+(F modulo 3) where 0≤N≤2, wherein N is an integer number and i denotes the index of the allowed access slot, wherein only access slots having indices within the range 0 to 7 are valid. Based on the above equation, the values indicated in the column A=1 of the table shown in FIG. 3 are obtained.

Since each bit of the parameter A indicates either an inclusion or exclusion of a subset of access slots, the subsets are defined by A=1 (001), A=2 (010) and A=4 (100), which reflect the binary weights of the binary expression.

Basically, the subsets for A=2 are obtained by increasing the indices of the subsets for A=1 by one, wherein the value 8 is deleted and transferred as a value 0 to the next radio frame F+1. Similarly, the subset of allowed access slots for A=4 is obtained from the subset for A=2 by increasing the indices by one and transferring an obtained value 8 as a value 0 to the subsequent radio frame. Thus, an offset added to a basic subset (A=1) is determined by the value of the parameter A.

The other sets of allowed access slots for the remaining values of the parameter A can be determined by adding respective ones of the subsets given in the table of FIG. 3 based on the bit values in the binary expression of the parameter A. E.g., in case the parameter A equals to 7 having the binary expression 111 and thus including all binary weights, the subsets for A=1, A=2 and A=4 are all included in the set of allowed access slots, which leads to the maximum allowable slot number. Furthermore, in case A equals to 5 having the binary expression 101, the subsets defined by A=1 and A=4 are added to obtain the set of allowed access slots, and so on.

In the following, an index of an access slot is denoted by a pair (F, a), wherein F ($0 \leq F \leq (N_F-1)$) denotes the frame index and a ($0 \leq a \leq 7$) denotes the access slot index (within a frame F). E.g., the allowed access slots for A=1 and F=0, shown in FIG. 3, can be expressed as (0,0) (0,3) and (0,6).

$(F^1_u, a^1_u)_0$ denotes any uplink access slot for A=1 and $T_{AICH}=0$. The corresponding downlink access slots determined by the slot determination unit 12 of the BTS 10 are given by $(F^1_d, a^1_d)_0$, wherein $F^1_d=(F^1_u+a^1_d/8)$ modulo $N_F$ and $a^1_d=(a^1_u+1)$ modulo 8 in the above case of eight access slots per radio frame. In the equation for $F^1_d$ "/" stands for an integer division, i.e. truncation. Thus, in general, a downlink access slot is given by $(F^x_d, a^x_d)_0=(F^x_u, a^x_u)_0+1$, for A=x and $T_{AICH}=0$.

Accordingly, when A equals to 2 (010 in binary expression), the allowed uplink access slots are defined by $(F^2_u, a^2_u)_0=(F^1_u, a^1_u)_0+1$. Similarly, $(F^4_u, a^4_u)_0=(F^2_u, a^2_u)_0+1$.

Due to the modulo 3 operation for the frame index F, the allowed access slots are changed over three consecutive radio frames. The reason therefore is that the cycle of the PRACH access slot timing is 30 ms, which corresponds to three radio frames.

FIG. 4 shows a table indicating the relationship between the allowed access slots and the parameter A in case the value of $T_{AICH}=1$.

In this case, the allowed access slots are equal in any radio frame, i.e. the determination is performed irrespective of the frame index F. This is due to the fact that the cycle of the PRACH access slot timing is one radio frame if $T_{AICH}1$.

When $T_{AICH}1$, the parameter A ranges between 0 and 15, i.e. comprises four bits in the binary expression. Therefore, four different sets of allowed access slots are defined, wherein each bit of the parameter A indicates either an inclusion or exclusion of the corresponding set of allowed access slots.

When A equals to 0 (0000 in binary expression), the transmission of a preamble signature or an AI is forbidden in all access slots.

When A equals to 1 (0001 in binary expression), the indices of the allowed access slots are 0 and 4 for any value of F. When A equals to 2 (0010 in binary expression), the indices of the allowed access slots equal to 1 and 5 for any value of F. When A equals to 4 (0100) and 8 (1000), the indices of the allowed access slots are 2, 6 and 3, 7, respectively, for any value of F.

The indices for the other values of the parameter A are determined on the basis of the bit constellation in the binary expression of A, as in the case of $T_{AICH}=0$. Thus, all available slots are allowed in the case of A=15 (1111 in binary expression).

In general, the allowed downlink access slots are determined by $(F^x_d, a^x_d)_1=(F^X_u, a^x_u)_1+2$, for A=x and $T_{AICH}1$.

Thus, basically, the indices of the downlink access slots are obtained by increasing the indices of the uplink access slots by 2.

Thus, the number of allowed PRACH uplink access slots and AICH downlink access slots can be configured in accordance with the requirements of the random access communication or the hardware resources at the BTS 10.

Second Example

According to the second example of the preferred embodiment, fifteen access slots are provided per 20 ms, wherein two consecutive radio frames 2·F and 2·F+1 ($0 \leq F \leq (N_F/2-1)$) contain fifteen PRACH or AICH access slots each having an index a, where $0 \leq a \leq 15$. In the present case, the two consecutive radio frames 2·F and 2·F+1 are denoted by Γ indicating a PRACH or an AICH frame of length 20 ms. Thus, Γ contains 15 access slots having a length of roughly 1.33 ms (20 ms/15). The frame index Γ ranges from 0 to ($N_F/2-1$).

FIG. 5 shows a table indicating the relationship between the allowed access slots and the parameter A in case the value of $T_{AICH}=0$.

In case of $T_{AICH}=0$, i.e. $0 \leq A \leq 7$, the transmission of a preamble signature or an AI is also forbidden in all access slots, if A equals to 0 (000 in binary expression).

When A equals to 1 (001 in binary expression), allowed access slots indices are 0, 3, 6, 9, and 12, i.e. $(\Gamma^1_u, 0)_0$, $(\Gamma^1_u, 3)_0$ $(\Gamma^1_u, 6)_0$, $(\Gamma^1_u, 9)_0$, and $(\Gamma^1_u, 12)_0$, for any Γ, since the cycle of the PRACH access slot timing is one radio frame.

When A equals to 2 (010 in binary expression), allowed access slots $(\Gamma^2_u, a^2_u)_0$ are obtained by $(\Gamma^1_u, a^1_u)_0+1$ for all available access slots $(\Gamma^1_u, a^1_u)_0$, i.e. allowed access slot indices are 1, 4, 7, 10, and 13. Now, $(\Gamma^1, _{a^1}) =(\Gamma, a)+1$ is defined by $\Gamma^1=(\Gamma+a^1/15)$ modulo $N_F/2$ and $a^1=(a+1)$ modulo 15. Thus, allowed access slots are $(\Gamma^2_u, 1)_0$, $(\Gamma^2_u, 4)_0$, $(\Gamma^2_u, 7)_0$, $(\Gamma^2_u, 10)_0$, and $(\Gamma^2_u, 13)_0$, for any Γ.

Similarly, when A equals to 4 (100 in binary expression), allowed access slot indices are 2, 5, 8, 11, and 14, since $(\Gamma^4_u, a^4_u)_0=(\Gamma^2_u, a^2_u)_0+1$.

In general, downlink access slots are obtained from $(\Gamma^x_d, a^x_d)_0=(\Gamma^x_u, a^x_u)_0+1$.

FIG. 6 shows a table indicating allowed subsets of access slots in dependence on the parameter A and the frame index Γ, in case the value of the parameter $T_{AICH}$ equals to 1.

In the case of $T_{AICH}=1$, i.e. $0 \leq A \leq 15$, the transmission of a preamble signature of an AI is again forbidden in all access slots, as long as A equals to 0 (0000 in binary expression).

When A equals to 1 (0001 in binary expression), allowed access slots indices for any frame Γ are obtained from the equation:

$$i=4 \cdot N+(\Gamma \bmod 4) \text{ where } 0 \leq N \leq 3,$$

wherein N is an integer number and i denotes the index of the allowed access slot, wherein only access slots having indices within the range 0 to 14 are valid.

When A equals to 2, 4 or 8, allowed access slots are obtained from $(\Gamma^{2n}_u, a^{2n}_u)_1=(\Gamma^n_u, a^n_u)_1+1$. Thus access slot indices for the case A=2 can be computed from the indices obtained for the case A=1, etc.

In general, downlink access slots are obtained from $(\Gamma^x_d, a^x_d)_1=(\Gamma^x_u, a^x_u)_1+2$.

It is to be noted that, also in the second example, the sets of allowed access slots are determined for the other values of the parameter A by combining (adding) the subsets shown in the tables of FIGS. 5 and 6 in accordance with the bit values of the respective binary expressions of the remaining parameter values, as described in the first example.

In the following, the selection of one or a plurality of access slots by the slot selection unit 24 of the MS 20 is described in greater detail.

The slot selection unit 24 may be arranged to randomly select one of the allowed uplink access slots determined based on e.g. one of the algorithms described in the first or second examples by the slot determination unit 23. Once the selection is done, consecutive preambles may be transmitted either three or four access slots apart (preamble-to-preamble timing), depending on the value of $T_{AICH}$. Therefore, the MS 20 randomly picks a number x defining the subset of access slots which will be used by the MS 20. For $T_{AICH}=0$ and $T_{AICH}=1$, the values of x may be taken from the sets $\{1, 2, 4\}$ and $\{1, 2, 4, 8\}$, respectively. Then, the selected uplink access slots are defined by all $(F^x_u, a^x_u)$'s or $(F^x_u, a^x_u)$'s, respectively.

Alternatively, the slot selection unit 24 of the MS 20 may be arranged to randomly select any allowed uplink access slot, when a preamble signature needs to be transmitted. Once the access slot has been selected, the PRACH and AICH timings are followed. Therefore, each time a preamble signature needs to be transmitted, the slot selection unit 24 of the MS 20 randomly selects a number x from the sets $\{1, 2, 4\}$ or $\{1, 2, 4, 8\}$ (depending on the value of $T_{AICH}$) and then transmits using the next allowed access slot of $(F^x_u, a^x_u)$ or $(F^x_u, a^x_u)$ respectively. In this case, the preamble-to-preamble timing may be three, four or five access slots, depending on the value of x (case $T_{AICH}=0$) For $T_{AICH}=1$, the preamble-to-preamble timing may be four, five, six or seven slots, depending on the value of x.

It is to be pointed out that the random access method and system described in the preferred embodiment can be applied to any radio network having a random access function between mobile terminals and fixed network elements. Furthermore, the discrete hardware units of the MS 20 and BTS 10 may be replaced by corresponding software features of a control program controlling a CPU provided in the BTS 10 or the MS 20. The above description of the preferred embodiment and the accompanying drawings are only intended to illustrate the present invention. The preferred embodiment of the invention may vary within the scope of the attached claims.

In summary, the present invention relates to a method and system for performing a random access operation between a mobile station and a network element such as a base transceiver station, wherein allowed access slots for random access channels are defined by the network and signaled to the mobile station. The definition of the allowed access slots is performed on the basis of a parameter set by the base transceiver station and transmitted to the mobile station which determines the allowed access slots based on the parameter. Thus, the number of allowed access slots can be defined by the network and can be changed dynamically based on the random access messaging load and the hardware requirements.

The invention claimed is:

1. A method, comprising:
    receiving a dynamically adjustable parameter defining allowed access slots of a physically existing random access channel from a base transceiver station of a mobile communications network by at least one mobile station of a plurality of mobile stations of the mobile communications network, wherein said parameter defines the total number of allowed access slots that make up each frame of the physically existing random access channel;
    determining, at said at least one mobile station, said allowed access slots of the physically existing random access channel based on said parameter;
    using, at said at least one mobile station, at least one of said determined allowed access slots of the physically existing random access channel to initiate a random access operation with said base transceiver station; and
    receiving said parameter via a broadcast channel, wherein said broadcast channel is a broadcast channel of a wideband code division multiple access system.

2. The method according to claim 1, wherein said parameter defines a subset of available access slots of said mobile communications network.

3. The method according to claim 2, further comprising:
    determining said subset by another parameter transmitted from said base transceiver station to said mobile station.

4. The method according to claim 3, wherein said other parameter is a timing parameter defining a transmission timing of an uplink access slot.

5. The method according to claim 3, further comprising:
    changing a bit number of said parameter in dependence on said other parameter.

6. The method according to 1, further comprising:
    determining an index of an allowed uplink access slot on the basis of a value of
    said parameter irrespective of a frame number of a frame used to transmit an uplink access slot.

7. The method according to claim 1, wherein said parameter is dynamically adjusted by said mobile communications network based on at least one of random access messaging load and hardware requirements at said base transceiver station.

8. The method according to claim 1, further comprising:
    receiving, at said at least one mobile station, an adjusted parameter defining a modified set of allowed access slots of the physically existing random access channel from said base transceiver station via said broadcast channel;
    determining, at said at least one mobile station, said modified set of allowed access slots of the physically existing random access channel based on said adjusted parameter; and
    using, at said at least one mobile station, at least one of said determined modified set of allowed access slots of the physically existing random access channel to initiate a second random access operation with said base transceiver station.

9. The method of claim 1, wherein said parameter defining the total number of allowed access slots that make up each frame of the physically existing random access channel is separate from another parameter that defines a transmission timing of the allowed access slots that make up each frame of the physically existing random access channel.

10. The method of claim 1, further comprising receiving another parameter, separate from said parameter defining the total number of allowed access slots that make up each frame of the physically existing random access channel, the other parameter defining a transmission timing of the allowed access slots that make up each frame of the physically existing random access channel.

11. A method, comprising:
    receiving a dynamically adjustable parameter defining allowed access slots of a physically existing random access channel from a base transceiver station of a mobile communications network by at least one mobile station of a plurality of mobile stations of the mobile communications network, wherein said parameter defines the total number of allowed access slots that make up each frame of the physically existing random access channel;

determining, at said at least one mobile station, said allowed access slots of the physically existing random access channel based on said parameter;

using, at said at least one mobile station, at least one of said determined allowed access slots of the physically existing random access channel to initiate a random access operation with said base transceiver station;

receiving said parameter via a broadcast channel; and initiating said random access operation via a physical random access channel uplink channel and an acquisition indication channel downlink channel of the wideband code division multiple access system.

12. The method according to claim 11, wherein said parameter is dynamically adjusted by said mobile communications network based on at least one of random access messaging load and hardware requirements at said base transceiver station.

13. The method according to claim 11, further comprising:
receiving, at said at least one mobile station, an adjusted parameter defining a modified set of allowed access slots of the physically existing random access channel from said base transceiver station via said broadcast channel;

determining, at said at least one mobile station, said modified set of allowed access slots of the physically existing random access channel based on said adjusted parameter;

using, at said at least one mobile station, at least one of said determined modified set of allowed access slots of the physically existing random access channel to initiate a second random access operation with said base transceiver station; and initiating said second random access operation via said physical random access channel uplink channel and said acquisition indication channel downlink channel of the wideband code division multiple access system.

14. A method, comprising:
receiving a parameter defining allowed access slots of a physically existing random access channel from a base transceiver station of a mobile communications network by at least one mobile station of a plurality of mobile stations of the mobile communications network;

determining, at said at least one mobile station, said allowed access slots of the physically existing random access channel based on said parameter;

using, at said at least one mobile station, at least one of said determined allowed access slots of the physically existing random access channel to initiate a random access operation with said base transceiver station, wherein said parameter defines a subset of available access slots of said mobile communications network;

determining said subset by another parameter transmitted from said base transceiver station to said mobile station;

changing a bit number of said parameter in dependence on said other parameter; and disabling a transmission of a preamble signature or an acquisition indication in dependence on a value of said parameter.

15. The method according to claim 14, further comprising:
receiving said parameter via a broadcast channel.

16. A method, comprising:
receiving a parameter defining allowed access slots of a physically existing random access channel from a base transceiver station of a mobile communications network by at least one mobile station of a plurality of mobile stations of the mobile communications network;

determining, at said at least one mobile station, said allowed access slots of the physically existing random access channel based on said parameter;

using, at said at least one mobile station, at least one of said determined allowed access slots of the physically existing random access channel to initiate a random access operation with said base transceiver station, wherein said parameter defines a subset of available access slots of said mobile communications network;

determining said subset by another parameter transmitted from said base transceiver station to said mobile station;

changing a bit number of said parameter in dependence on said other parameter; and calculating an index of an allowed uplink access slot on the basis of a value of said parameter and a frame number of a frame used for transmitting an uplink access slot.

17. A method, comprising:
receiving a parameter defining allowed access slots of a physically existing random access channel from a base transceiver station of a mobile communications network by at least one mobile station of a plurality of mobile stations of the mobile communications network;

determining, at said at least one mobile station, said allowed access slots of the physically existing random access channel based on said parameter; and using, at said at least one mobile station, at least one of said determined allowed access slots of the physically existing random access channel to perform a random access operation with said base transceiver station, wherein said parameter defines a subset of available access slots of said mobile communications network, wherein said subset is determined by another parameter transmitted from said base transceiver station to said at least one mobile station, wherein a bit number of said parameter is changed in dependence on said other parameter, wherein an index of an allowed uplink access slot is calculated on the basis of the value of said parameter and a frame number of a frame used for transmitting an uplink access slot, wherein said index is calculated by using the equation $$i = 3 \cdot N + (F \bmod 3)$$

where $0 \leq N \leq 2$, wherein F and N are integers, and F denotes said frame number, and wherein only access slots having indices within the range 0 to 7 are valid.

18. The method according to claim 17, wherein said parameter determines an offset to be added to said calculated index.

19. A method, comprising:
receiving a parameter defining allowed access slots of a physically existing random access channel from a base transceiver station of a mobile communications network by at least one mobile station of a plurality of mobile stations of the mobile communications network;

determining, at said at least one mobile station, said allowed access slots of the physically existing random access channel based on said parameter; and using, at said at least one mobile station, at least one of said determined allowed access slots of the physically existing random access channel to perform a random access operation with said base transceiver station wherein said parameter defines a subset of available access slots of said mobile communications network, wherein said subset is determined by another parameter transmitted from said base transceiver station to said mobile station, wherein a bit number of said parameter is changed in dependence on said other parameter, wherein an index of an allowed uplink access slot is calculated on the basis of the value of said parameter and a frame number of a frame used for transmitting an uplink access slot, wherein said index is calculated by using the equation $$i=4\cdot N+(\Gamma \text{ modulo } 4)$$

where $0 \leq N \leq 3$, wherein $\Gamma$ and N are integers, and 64 denotes a frame number indicating two consecutive frame numbers of said frame used to transmit an uplink access slot, and wherein only access slots having indices within the range 0 to 14 are valid.

20. A method, comprising:

receiving a parameter defining allowed access slots of a physically existing random access channel from a base transceiver station of a mobile communications network by at least one mobile station of a plurality of mobile stations of the mobile communications network;

determining, at said at least one mobile station, said allowed access slots of the physically existing random access channel based on said parameter; and using, at said at least one mobile station, at least one of said determined allowed access slots of the physically existing random access channel to initiate a random access operation with said base transceiver station, wherein bit values of a binary expression of said parameter determine a combination of calculated indices obtained for other values of said parameter, said other values corresponding to binary weights of said binary expression.

21. A system, comprising:

a base transceiver station configured to transmit a dynamically adjustable parameter defining allowed access slots of a physically existing random access channel, wherein said parameter defines the total number of allowed access slots that make up each frame of the physically existing random access channel; and a plurality of mobile stations configured to receive said parameter to determine said allowed access slots of the physically existing random access channel based on said parameter, and to use at least one of said determined allowed access slots of the physically existing random access channel to initiate a random access operation with said base transceiver station, wherein said base transceiver station is a wideband code division multiple access base transceiver station and said plurality of mobile stations are wideband code division multiple access mobile stations.

22. The system according to claim 21, wherein said base transceiver station is further configured to dynamically adjust said parameter based on at least one of random access messaging load and hardware requirements at said base transceiver station.

23. The system according to claim 21, wherein:

said base transceiver station is further configured to dynamically adjust said parameter and to transmit said adjusted parameter defining a modified set of allowed access slots of said physically existing random access channel; and said plurality of mobile stations are further configured to receive said adjusted parameter to determine said modified set of allowed access slots of the physically existing random access channel based on said adjusted parameter, and to use at least one of said determined modified set of allowed access slots of the physically existing random access channel to initiate a second random access operation with said base transceiver station.

24. An apparatus, comprising:

setting means for setting a dynamically adjustable parameter defining allowed access slots of a physically existing random access channel, wherein said parameter defines the total number of allowed access slots that make up each frame of the physically existing random access channel, and wherein at least one mobile station initiates a random access operation to the apparatus based on the allowed access slots of the physically existing random access channel; and transmitting means for transmitting said parameter to said plurality of mobile stations, wherein said apparatus is a wideband code division multiple access base transceiver station.

25. The apparatus according to claim 24, wherein said transmitting means transmits said parameter via a broadcast channel.

26. The apparatus according to claim 24, wherein said setting means sets said parameter in dependence on a timing parameter value defining a transmission timing of an uplink access slot in said random access operation.

27. The apparatus according to claim 24, wherein said setting means comprises means for dynamically adjusting said parameter based on at least one of random access messaging load and hardware requirements at said base transceiver station.

28. The apparatus according to claim 24, wherein:

said setting means comprises means for dynamically adjusting said parameter to define a modified set of allowed access slots of the physically existing random access channel, wherein at least one mobile station initiates a random access operation to the apparatus based on the modified set of allowed access slots of the physically existing random access channel; and said transmitting means comprises means for transmitting said adjusted parameter to said plurality of mobile stations.

29. An apparatus, comprising:

a receiver configured to receive from a network element a dynamically adjustable parameter defining allowed access slots of a physically existing random access channel for a random access operation, wherein said parameter defines the total number of allowed access slots that make up each frame of the physically existing random access channel;

a processor configured to determine said allowed access slots of the physically existing random access channel based on said parameter received from said network element; and a transmitter configured to initiate transmission of a random access message to said network element using at least one of said determined allowed access slots of the physically existing random access channel, wherein the processor is further configured to randomly select an uplink access slot to be used for transmitting a preamble of said random access message from the allowed access slots of the physically existing random access channel determined by said processor, and wherein consecutive preambles are transmitted a predetermined number of access slots apart.

30. The apparatus according to claim 29, wherein said receiver is configured to receive said parameter via a broadcast channel.

31. The apparatus according to claim 29, wherein said processor is further configured to determine said allowed access slots of the physically existing random access channel on the basis of said received parameter and a timing parameter received via said broadcast channel.

32. The apparatus according to claim 29, wherein said processor is further configured to calculate an index of an allowed uplink access slot on the basis of the value of said received parameter and a frame number of a frame used to transmit an uplink access slot.

33. The apparatus according to claim 29, wherein said processor is further configured to determine an index of an allowed uplink access slot on the basis of the value of said parameter irrespective of a frame number of a frame used to transmit an uplink access slot.

34. The apparatus according to claim 29, wherein said predetermined number depends on a timing parameter received by said receiver.

35. The apparatus according to claim 29, wherein said processor is further configured to perform said random selection any time a preamble needs to be transmitted.

36. The apparatus according to claim 29, wherein said parameter is dynamically adjusted by said network element based on at least one of random access messaging load and hardware requirements at said network element.

37. The apparatus according to claim 29, wherein:
said receiver is further configured to receive from said network element an adjusted parameter defining a modified set of allowed access slots of the physically existing random access channel for a second random access operation;
said processor is further configured to determine said modified set of allowed access slots of the physically existing random access channel based on said adjusted parameter received from said network element; and
said transmitter is further configured to initiate transmission of a second random access message to said network element using at least one of said determined modified set of allowed access slots of the physically existing random access channel, and to randomly select an uplink access slot to be used for transmitting a preamble of said second random access message from the modified set of allowed access slots of the physically existing random access channel determined by said processor.

38. An apparatus, comprising:
a processor configured to receive a dynamically adjustable parameter defining allowed access slots of a physically existing random access channel from a base transceiver station of a mobile communications network, wherein said parameter defines the total number of allowed access slots that make up each frame of the physically existing random access channel, determine said allowed access slots of the physically existing random access channel based on said parameter, use at least one of said determined allowed access slots of the physically existing random access channel to initiate a random access operation with said base transceiver station, and receive said parameter via a broadcast channel, wherein said broadcast channel is a broadcast channel of a wideband code division multiple access system.

39. The apparatus according to claim 38, wherein said parameter is dynamically adjusted by said mobile communications network based on at least one of random access messaging load and hardware requirements at said base transceiver station.

40. The apparatus according to claim 38, wherein said processor is further configured to receive an adjusted parameter defining a modified set of allowed access slots of the physically existing random access channel from said base transceiver station of said mobile communications network via said broadcast channel, determine said modified set of allowed access slots of the physically existing random access channel based on said adjusted parameter, and use at least one of said determined modified set of allowed access slots of the physically existing random access channel to initiate a second random access operation with said base transceiver station.

41. An apparatus, comprising:
a processor configured to receive a dynamically adjustable parameter defining allowed access slots of a physically existing random access channel from a base transceiver station of a mobile communications network, wherein said parameter defines the total number of allowed access slots that make up each frame of the physically existing random access channel, determine said allowed access slots of the physically existing random access channel based on said parameter, use at least one of said determined allowed access slots of the physically existing random access channel to initiate a random access operation with said base transceiver station, receive said parameter via a broadcast channel, and initiate said random access operation via a physical random access channel uplink channel and an acquisition indication channel downlink channel of the wideband code division multiple access system.

42. The apparatus according to claim 41, wherein said parameter is dynamically adjusted by said mobile communications network based on at least one of random access messaging load and hardware requirements at said base transceiver station.

43. The apparatus according to claim 41, wherein said processor is further configured to receive an adjusted parameter defining a modified set of allowed access slots of the physically existing random access channel from said base transceiver station of said mobile communications network via said broadcast channel, determine said modified set of allowed access slots of the physically existing random access channel based on said adjusted parameter, use at least one of said determined modified set of allowed access slots of the physically existing random access channel to initiate a second random access operation with said base transceiver station, and initiate said second random access operation via said physical random access channel uplink channel and said acquisition indication channel downlink channel of the wideband code division multiple access system.

44. An apparatus, comprising:
a processor configured to receive a parameter defining allowed access slots of a physically existing random access channel from a base transceiver station of a mobile communications network, determine said allowed access slots of the physically existing random access channel based on said parameter, use at least one of said determined allowed access slots of the physically existing random access channel to initiate a random access operation with said base transceiver station, wherein said parameter defines a subset of available access slots of said mobile communications network, determine said subset by another parameter transmitted from said base transceiver station, change a bit number of said parameter in dependence on said other parameter, and disable a transmission of a preamble signature or an acquisition indication in dependence on a value of said parameter.

45. An apparatus, comprising:
a processor configured to receive a parameter defining allowed access slots of a physically existing random access channel from a base transceiver station of a mobile communications network, determine said allowed access slots of the physically existing random access channel based on said parameter, use at least one of said determined allowed access slots of the physically existing random access channel to initiate a random access operation with said base transceiver station, wherein said parameter defines a subset of available access slots of said mobile communications network, determine said subset by another parameter transmitted from said base transceiver station, change a bit number of said parameter in dependence on said other parameter, and calculate an index of an allowed uplink access slot on the basis of a value of said parameter and a frame number of a frame used for transmitting an uplink access slot.

46. An apparatus, comprising:
a processor configured to receive a parameter defining allowed access slots of a physically existing random access channel from a base transceiver station of a mobile communications network; determine said allowed access slots of the physically existing random access channel based on said parameter, and use at least one of said determined allowed access slots of the physically existing random access channel to perform a random access operation with said base transceiver station, wherein said parameter defines a subset of available access slots of said mobile communications network, wherein said subset is determined by another parameter transmitted from said base transceiver station, wherein a bit number of said parameter is changed in dependence on said other parameter, wherein an index of an allowed uplink access slot is calculated on the basis of the value of said parameter and a frame number of a frame used for transmitting an uplink access slot,
wherein said index is calculated by using the equation $$i = 3 \cdot N + (F \bmod 3)$$

where $0 \leq N \leq 2$,
wherein F and N are integers, and F denotes said frame number, and
wherein only access slots having indices within the range 0 to 7 are valid.

47. An apparatus, comprising:
a processor configured to receive a parameter defining allowed access slots of a physically existing random access channel from a base transceiver station of a mobile communications network, determine said allowed access slots of the physically existing random access channel based on said parameter, and use at least one of said determined allowed access slots of the physically existing random access channel to perform a random access operation with said base transceiver station, wherein said parameter defines a subset of available access slots of said mobile communications network, wherein said subset is determined by another parameter transmitted from said base transceiver station, wherein a bit number of said parameter is changed in dependence on said other parameter, wherein an index of an allowed uplink access slot is calculated on the basis of the value of said parameter and a frame number of a frame used for transmitting an uplink access slot, wherein said index is calculated by using the equation $$i = 4 \cdot N + (\Gamma \bmod 4)$$

where $0 \leq N \leq 3$,
wherein $\Gamma$ and N are integers, and $\Gamma$ denotes a frame number indicating two consecutive frame numbers of said frame used to transmit an uplink access slot, and wherein only access slots having indices within the range 0 to 14 are valid.

48. An apparatus, comprising:
a processor configured to receive a parameter defining allowed access slots of a physically existing random access channel from a base transceiver station of a mobile communications network, determine said allowed access slots of the physically existing random access channel based on said parameter, and use at least one of said determined allowed access slots of the physically existing random access channel to initiate a random access operation with said base transceiver station, wherein bit values of a binary expression of said parameter determine a combination of calculated indices obtained for other values of said parameter, said other values corresponding to binary weights of said binary expression.

* * * * *